(12) United States Patent
Ishii et al.

(10) Patent No.: US 9,204,028 B2
(45) Date of Patent: Dec. 1, 2015

(54) DEVICE, SYSTEM, METHOD, AND COMPUTER-READABLE DEVICE FOR CONTROLLING THE DISPLAY OF IMAGES FROM A FIRST, LOCAL, IMAGING UNIT AND FROM A SECOND IMAGING UNIT IN A REMOTE DEVICE

(71) Applicant: Olympus Corporation, Shibuya-ku, Tokyo (JP)

(72) Inventors: Kensuke Ishii, Tokyo (JP); Hitoshi Echigo, Sagamihara (JP); Joji Sakamoto, Joensuu (FI); Saori Matsumoto, Tokyo (JP); Yoshitaka Soto, Yokohama (JP)

(73) Assignee: Olympus Corporation, Tokyo (JP)

( * ) Notice: Subject to any disclaimer, the term of this patent is extended or adjusted under 35 U.S.C. 154(b) by 0 days.

(21) Appl. No.: 14/197,621

(22) Filed: Mar. 5, 2014

(65) Prior Publication Data

US 2014/0375830 A1    Dec. 25, 2014

(30) Foreign Application Priority Data

Mar. 6, 2013   (JP) .................................. 2013-044583

(51) Int. Cl.
*H04N 5/232*    (2006.01)
(52) U.S. Cl.
CPC ....... *H04N 5/23206* (2013.01); *H04N 5/23293* (2013.01)
(58) Field of Classification Search
CPC .................................................. H04N 5/23203
USPC ............................... 348/211.2–211.4, 211.14
See application file for complete search history.

(56) References Cited

U.S. PATENT DOCUMENTS

2012/0083313 A1*    4/2012   Marcus .................... 455/556.1

FOREIGN PATENT DOCUMENTS

| JP | 2004-235780 | 8/2004 |
|----|-------------|--------|
| JP | 2011-024044 | 2/2011 |
| JP | 2012-129807 | 7/2012 |

* cited by examiner

*Primary Examiner* — Joel Fosselman
(74) *Attorney, Agent, or Firm* — John C. Pokotylo; Straub & Pokotylo

(57) ABSTRACT

A captured image display device includes: a wireless communication unit; an imaging unit; a display unit; an imaging instruction unit which issues an imaging instruction to a remote camera that wirelessly communicates with the wireless communication unit; an image processing unit which performs image processing to convert an image data captured by the imaging unit into an image displayed on the display unit, and when the wireless communication unit wirelessly receives an image data corresponding to an image which is captured by the remote camera based on the imaging instruction, performs image processing to convert the image data into the image displayed on the display unit; and a display control unit which causes an image corresponding to the image data to be displayed on the display unit until the image processing unit ends the image processing for the image data after the imaging instruction is issued.

7 Claims, 10 Drawing Sheets

DEVICE, SYSTEM, METHOD, AND COMPUTER-READABLE DEVICE FOR CONTROLLING THE DISPLAY OF IMAGES FROM A FIRST, LOCAL, IMAGING UNIT AND FROM A SECOND IMAGING UNIT IN A REMOTE DEVICE

BACKGROUND OF THE INVENTION

1. Field of the Invention

The present invention relates to a captured image display device, an imaging system, a captured image display method, and a computer-readable device.

Priority is claimed on Japanese Patent Application No. 2013-044583, filed Mar. 6, 2013, the contents of which are incorporated herein by reference.

2. Description of Related Art

An imaging system has been known in which an image captured by an imaging device is transmitted to a captured image display device through a network and the captured image display device displays the transmitted captured image. In this case, when the amount of data of the captured image is large, it takes a lot of time to transmit and receive the data and it is difficult for the captured image display device to display the captured image until the transmission and reception of the captured image are completed. Therefore, a captured image display device has been known which receives a live-view image from an imaging device, displays the live-view image on a display unit when a release notice is received from the imaging device, and displays the captured image on the display unit when the reception of the captured image from the imaging device is completed (for example, see Japanese Unexamined Patent Application, First Publication No. 2011-24044).

SUMMARY OF THE INVENTION

According to a first aspect of the present invention, a captured image display device includes: a wireless communication unit; an imaging unit; a display unit; an imaging instruction unit which issues an imaging instruction to a remote camera that wirelessly communicates with the wireless communication unit; an image processing unit which performs image processing to convert image data captured by the imaging unit into an image displayed on the display unit, and when the wireless communication unit wirelessly receives image data corresponding to an image which is captured by the remote camera based on the imaging instruction, performs image processing to convert the wirelessly received image data into the image displayed on the display unit; and a display control unit which causes an image corresponding to the image data captured by the imaging unit to be displayed on the display unit until the image processing unit ends the image processing for the image data corresponding to the image which is captured by the remote camera based on the imaging instruction after the imaging instruction is issued.

According to a second aspect of the present invention, in the captured image display device according to the first aspect, the display control unit may cause the image corresponding to the image data captured by the imaging unit to be displayed on the display unit for a predetermined period of time when the imaging instruction is issued.

According to a third aspect of the present invention, in the captured image display device according to the first aspect, the imaging instruction unit may issue the imaging instruction to the remote camera which includes a multi-spectral imaging element having color filters of four or more colors.

According to a fourth aspect of the present invention, in the captured image display device according to the first aspect, the imaging instruction unit may issue the imaging instruction to the remote camera which includes a light field imaging element having a micro lens array.

According to a fifth aspect of the present invention, an imaging system includes a captured image display device and a remote camera. The captured image display device includes: a first wireless communication unit; a first imaging unit; a display unit; an imaging instruction unit which issues an imaging instruction to the remote camera that wirelessly communicates with the first wireless communication unit; an image processing unit which performs image processing to convert image data captured by the first imaging unit into an image displayed on the display unit, and when the first wireless communication unit wirelessly receives image data corresponding to an image which is captured by the remote camera based on the imaging instruction, performs image processing to convert the wirelessly received image data into the image displayed on the display unit; and a display control unit which causes an image corresponding to the image data captured by the first imaging unit to be displayed on the display unit until the image processing unit ends the image processing for the image data corresponding to the image which is captured by the remote camera on the basis of the imaging instruction after the imaging instruction is issued. The remote camera includes: a second wireless communication unit; a second imaging unit; and a control unit which causes image data to be captured by the second imaging unit based on the imaging instruction received from the captured image display device which wirelessly communicates with the second wireless communication unit and causes the image data captured by the second imaging unit to the captured image display device to be transmitted to the second wireless communication unit.

According to a sixth aspect of the present invention, a captured image display method includes: issuing an imaging instruction to a remote camera which wirelessly communicates with a wireless communication unit; performing image processing to convert image data captured by an imaging unit into an image displayed on a display unit, and when the wireless communication unit wirelessly receives image data corresponding to an image which is captured by the remote camera based on the imaging instruction, performing image processing to convert the wirelessly received image data into the image displayed on the display unit; and displaying an image corresponding to the image data captured by the imaging unit on the display unit until the image processing for the image data corresponding to the image which is captured by the remote camera based on the imaging instruction ends in the performing of the imaging processing after the imaging instruction is issued.

According to a seventh aspect of the present invention, there is provided a computer-readable device storing a program that causes a computer to perform: issuing an imaging instruction to a remote camera which wirelessly communicates with a wireless communication unit; performing image processing to convert image data captured by an imaging unit into an image displayed on a display unit and, when the wireless communication unit wirelessly receives image data corresponding to an image which is captured by the remote camera on the basis of the imaging instruction, performing image processing to convert the wirelessly received image data into the image displayed on the display unit; and displaying an image corresponding to the image data captured by the imaging unit on the display unit until the image processing for the image data corresponding to the image which is captured by the remote camera on the basis of the imaging instruction ends in the performance of the imaging processing after the imaging instruction is issued.

DETAILED DESCRIPTION OF THE INVENTION (First Embodiment)

Figure 1:
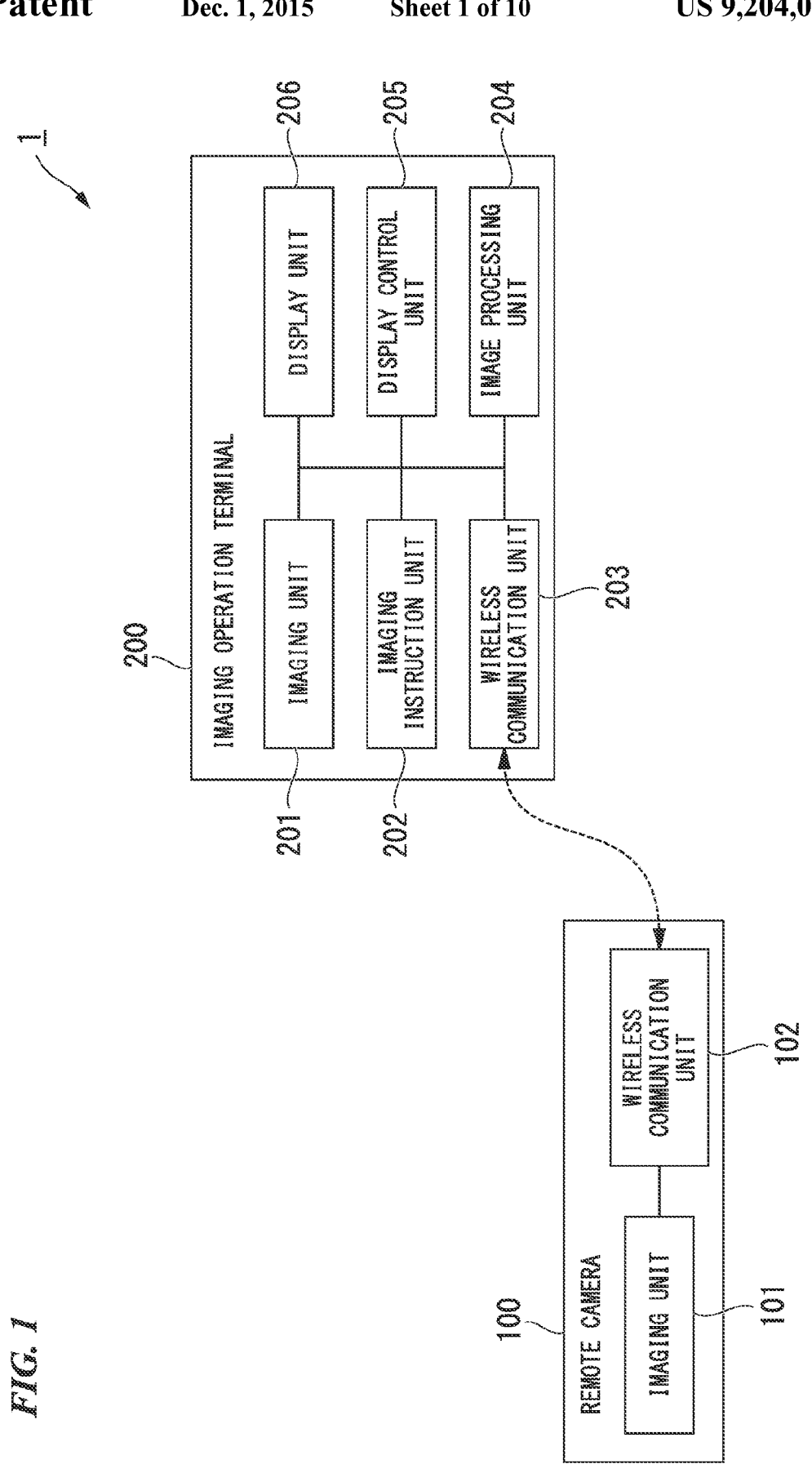
FIG. 1 is a block diagram illustrating the structure of an imaging system according to a first embodiment of the present invention.

Hereinafter, a first embodiment of the present invention will be described with reference to the drawings. FIG. 1 is a block diagram illustrating the structure of an imaging system 1 according to this embodiment. In the example shown in FIG. 1, the imaging system 1 includes a remote camera 100 and an imaging operation terminal 200 (captured image display device).

The remote camera 100 includes an imaging unit 101 (a second imaging unit and a control unit) and a wireless communication unit 102 (second wireless communication unit). The imaging unit 101 captures an image of an object and generates a RAW image signal. When receiving an imaging instruction message transmitted from the imaging operation terminal 200 through the wireless communication unit 102, the imaging unit 101 captures an image and generates a RAW image signal. Then, the imaging unit 101 transmits the generated RAW image signal to the imaging operation terminal 200 through the wireless communication unit 102. An example of the structure of the imaging unit 101 will be described below. The wireless communication unit 102 wirelessly communicates with the imaging operation terminal 200.

The imaging operation terminal 200 includes an imaging unit 201 (first imaging unit), an imaging instruction unit 202, a wireless communication unit 203 (first wireless communication unit), an image processing unit 204, a display control unit 205, and a display unit 206. The imaging unit 201 includes color filters which are arranged in a Bayer array and an optical sensor, captures the image of the object, and generates an image signal.

The imaging instruction unit 202 includes a shutter button and receives an imaging instruction input from the photographer (user). When receiving an input imaging instruction, the imaging instruction unit 202 transmits an imaging instruction message to capture images to the remote camera 100 through the wireless communication unit 203. The wireless communication unit 203 wirelessly communicates with the remote camera 100.

The image processing unit 204 performs image processing for converting the image signal generated by the imaging unit 201 into a format which can be displayed on the display unit 206 to generate display image data. In addition, the image processing unit 204 performs image processing for converting the RAW image signal generated by the imaging unit 101 into the format which can be displayed on the display unit 206 and generates display image data. In this embodiment, the image processing function of the image processing unit 204 is implemented by software. The display control unit 205 controls the display unit 206 and switch the image to display on the display unit 206. The display unit 206 is a device to display images, for example, a liquid crystal display.

Figure 2:
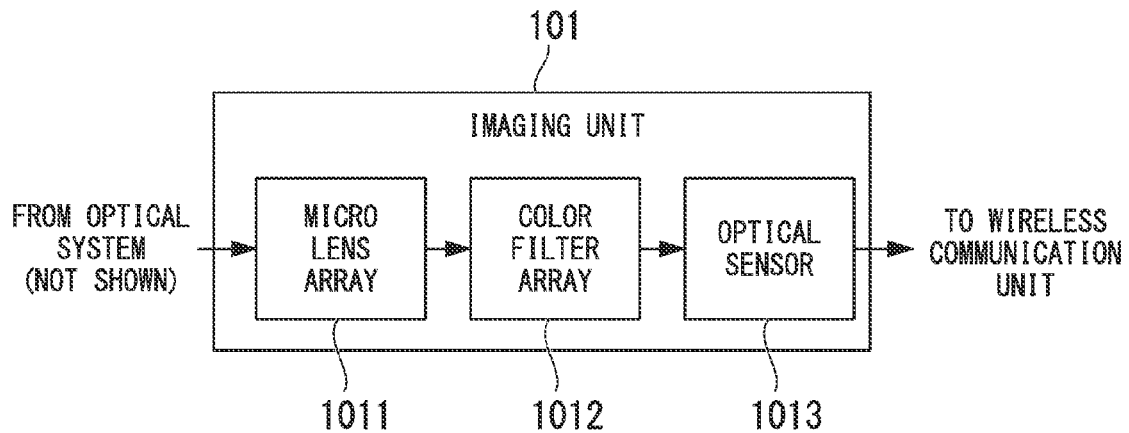
FIG. 2 is a block diagram illustrating an example of the configuration of an imaging unit with an LF structure according to the first embodiment of the present invention.
Figure 3:
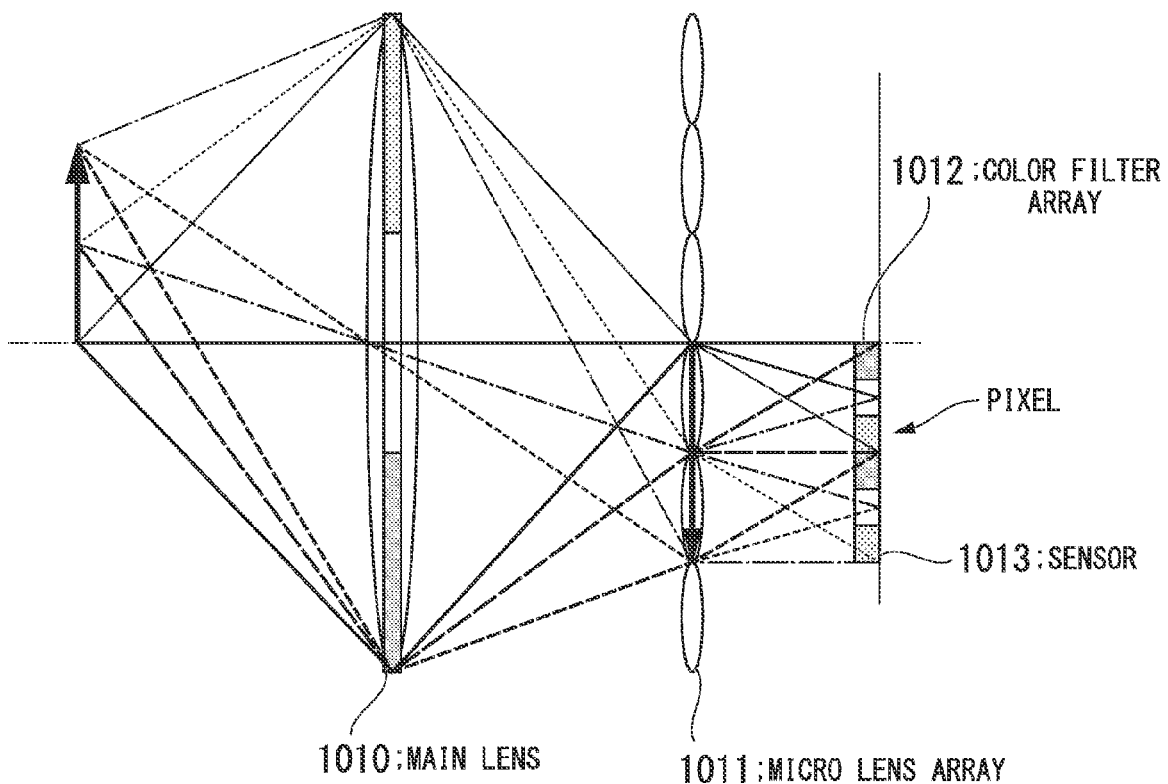
FIG. 3 is a cross-sectional view illustrating the cross-section of the imaging unit with the LF structure according to the first embodiment of the present invention.

Next, an example of the structure of the imaging unit 101 included in the remote camera 100 will be described. Hereinafter, a light field (LF) structure and a multi-spectral (MS) structure will be described as examples of the structure of the imaging unit 101. First, an example of the configuration of the imaging unit 101 with the LF structure will be described. FIG. 2 is a block diagram illustrating an example of the configuration of the imaging unit 101 with the LF structure according to this embodiment. FIG. 3 is a cross-sectional view illustrating the cross-section of the imaging unit 101 with the LF structure according to this embodiment. In the example shown in the drawings, the imaging unit 101 includes a micro lens array 1011, a color filter array 1012, and an optical sensor 1013.

Light which is focused by a main lens 1010 (optical system) is incident on the micro lens array 1011. In addition, light focused by the micro lens array 1011 passes through the color filter array 1012 and is incident on the optical sensor 1013. Therefore, the imaging unit 101 with the LF structure can generate a RAW image signal including the four-dimensional photophysical quantity of brightness information and beam direction information. When the RAW image signal generated by the imaging unit 101 with the LF structure is used, it is possible to change a focal position or to acquire depth information. The use of the RAW image signal generated by the general imaging unit (for example, an imaging unit including color filters which are arranged in the Bayer array and an optical sensor) makes it possible to acquire only two-dimensional brightness information.

Figure 4B:
FIG. 4B is a schematic diagram illustrating an example of the image signal output from image sensor with the LF structure according to the first embodiment of the present invention.
Figure 4A:
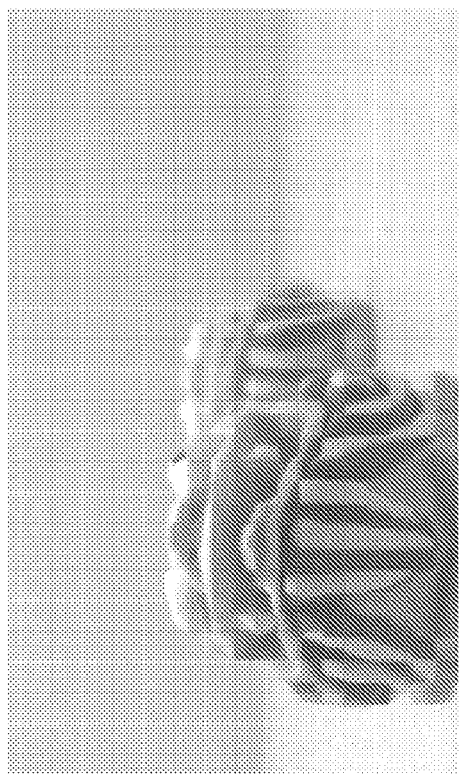
FIG. 4A is a schematic diagram illustrating an example of the object according to the first embodiment of the present invention.

In contrast, when the RAW image signal output from the imaging unit 101 with the LF structure is displayed without performing image processing for conversion into an RGB image, it is difficult to recognize the object. FIGS. 4A and 4B are schematic diagrams illustrating an example of the display of the image signal output from the imaging unit 101 with the LF structure according to this embodiment. FIG. 4A shows an example of the image of the object. FIG. 4B shows an example of an image when the image signal which is obtained from the image of the object shown in FIG. 4A captured by the imaging unit 101 with the LF structure is displayed, without being subjected to image processing for conversion into an RGB image. As shown in FIGS. 4A and 4B, when the image signal which is obtained from the image of the object shown in FIG. 4A captured by the imaging unit 101 with the LF structure is displayed, without being subjected to the image processing for conversion into an RGB image, lattice-shaped lines are displayed, which makes it difficult to recognize the object.

It is difficult to wirelessly transmit the image signal output from the imaging unit 101 with the LF structure in real time because the size of the image signal is large. When the image signal output from the imaging unit 101 with the LF structure is wirelessly transmitted to the imaging operation terminal 200, the image processing unit 204 of the imaging operation terminal 200 performs image processing for the image signal, and the processed image signal is displayed as a live-view image on the display unit 206, the displaying timing is behind the capturing timing.

Figure 5:
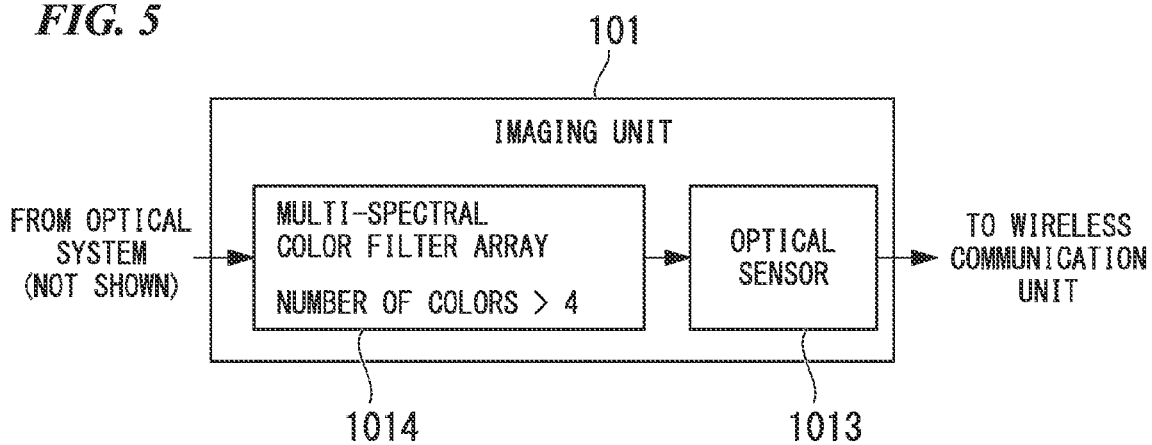
FIG. 5 is a block diagram illustrating an example of the configuration of an imaging unit with an MS structure according to the first embodiment of the present invention.

Next, an example of the configuration of the imaging unit 101 with the MS structure will be described. FIG. 5 is a block diagram illustrating an example of the configuration of the imaging unit 101 with the MS structure according to this embodiment. In the example shown in FIG. 5, the imaging unit 101 includes a multi-spectral color filter array 1014 including color filters of four or more colors and an optical sensor 1013.

Light which is focused by the optical system passes through the multi-spectral color filter array 1014 and is incident on the optical sensor 1013. Therefore, the imaging unit 101 with the MS structure can generate an image signal including more color information (four or more colors). Therefore, when the image signal generated by the imaging unit 101 with the MS structure is used, it is possible to accurately measure the color of the object. For example, in an application which needs to perform determination or processing on the basis of a slight color difference, it is preferable that the remote camera 100 (multi-spectral camera) include the imaging unit 101 with the MS structure. The general imaging unit (for example, an image unit including color filters which are arranged in the Bayer array and an optical sensor) can acquire only information about three colors.

Figure 6A:
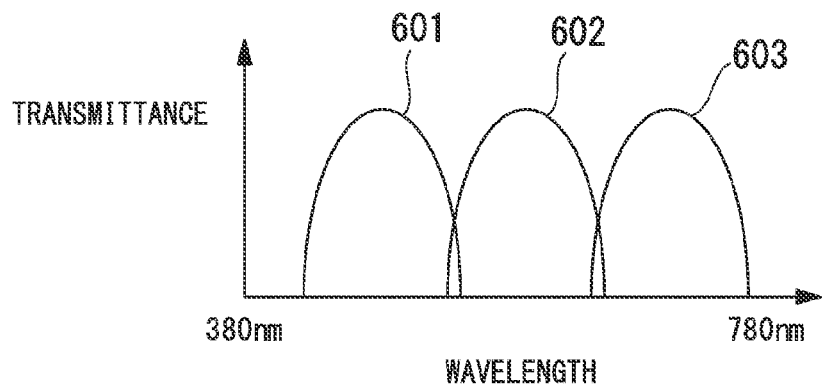
FIG. 6A is a graph illustrating an example of the transmittance of a Bayer-array color filter included in a general imaging unit of the first embodiment of the present invention.
Figure 6B:
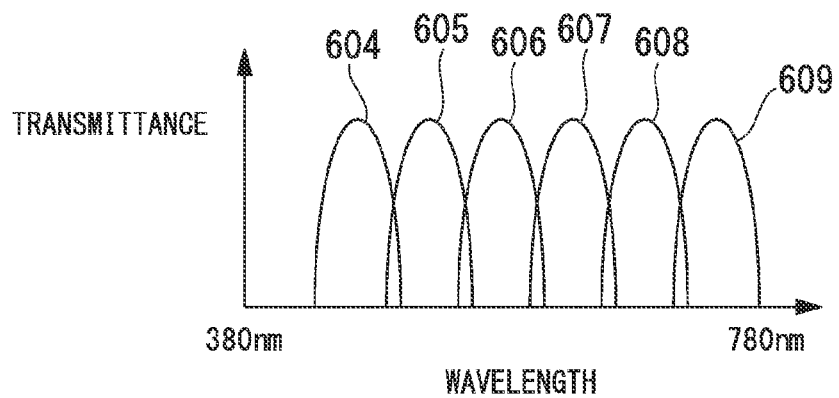
FIG. 6B is a graph illustrating an example of the transmittance of a color filter included in the imaging unit with the MS structure according to the first embodiment of the present invention.

FIG. 6A shows the transmittance of the Bayer-array color filter included in the general imaging unit. As represented by curves 601 to 603, the Bayer-array color filter transmits light of three colors. Therefore, the general imaging unit including the Bayer-array color filter and the optical sensor can acquire only information about three colors. FIG. 6B shows the transmittance of the color filter included in the imaging unit 101 with the MS structure. As represented by curves 604 to 609, in the example shown in FIG. 6B, the color filter included in the imaging unit 101 with the MS structure transmits light of six colors. Therefore, the imaging unit 101 with the MS structure can generate an image signal including more color information (in the example shown in FIG. 6B, information of six colors).

Figure 7:
FIG. 7 shows an example of an image when an image signal output from the imaging unit with the MS structure according to the first embodiment of the present invention is displayed, without being subjected to image processing for conversion into an RGB image.

When the image signal (RAW image) output from the imaging unit 101 with the MS structure is displayed, without being subjected to image processing for conversion into an RGB image, it is not displayed as a normal color image since the arrangement of pixels is special, which makes it difficult for the user to recognize the color of the object. FIG. 7 shows an example of an image when the image signal output from the imaging unit 101 with the MS structure according to this embodiment is displayed, without being subjected to image processing for conversion into an RGB image. When the image signal output from the imaging unit 101 with the MS structure is displayed, without being subjected to image processing for conversion into an RGB image, a monochrome image is displayed and it is difficult to recognize the object or an imaging state, as shown in FIG. 7.

Since the size of the image signal output from the imaging unit 101 with the MS structure is large, it is difficult to wirelessly transmit the image signal in real time. Therefore, when the image signal output from the imaging unit 101 with the MS structure is wirelessly transmitted to the imaging operation terminal 200, the image processing unit 204 of the imaging operation terminal 200 performs image processing for the image signal, and the processed image signal is displayed as a live-view image on the display unit 206, the displaying timing is behind the capturing time.

Figure 8:
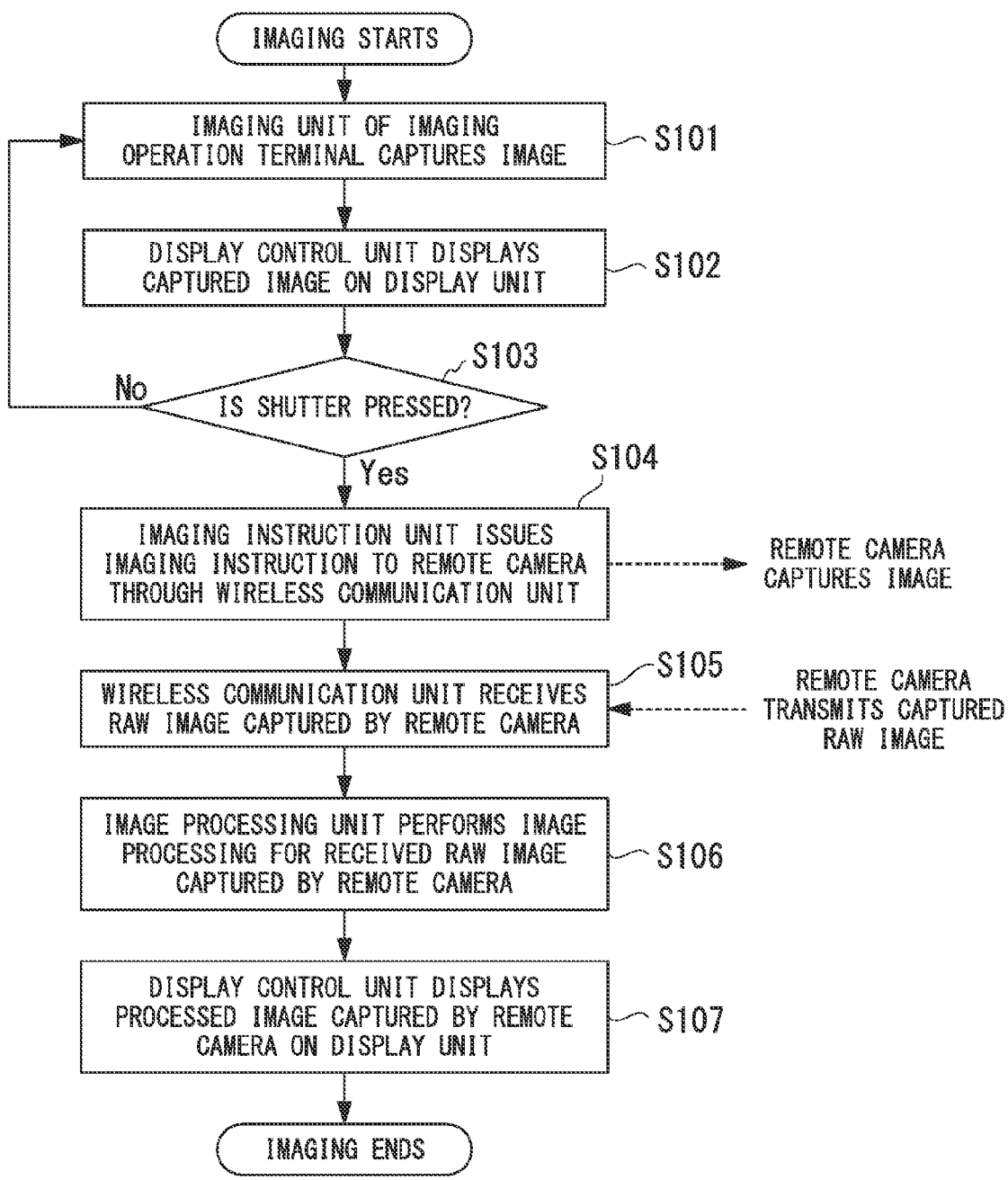
FIG. 8 is a flowchart illustrating an operation procedure of an imaging operation terminal according to the first embodiment of the present invention during imaging.

Next, the operation of the imaging operation terminal 200 during imaging will be described. FIG. 8 is a flowchart illustrating an operation procedure of the imaging operation terminal 200 according to this embodiment during imaging.

(Step S101) The imaging unit 201 of the imaging operation terminal 200 captures an image and generates an image signal. Then, the process proceeds to Step S102.

(Step S102) The image processing unit 204 performs image processing for the image signal generated by the imaging unit 201 in Step S101 to generate display image data. Then, the display control unit 205 displays the display image data generated by the image processing unit 204 as a live-view image on the display unit 206. Then, the process proceeds to Step S103.

(Step S103) When wanting to capture a still image, the user presses the shutter included in the imaging instruction unit 202 of the imaging operation terminal 200. The imaging instruction unit 202 determines whether the shutter has been pressed. When the imaging instruction unit 202 determines that the shutter has been pressed, the process proceeds to Step S104. In the other cases, the process returns to Step S101.

(Step S104) The imaging instruction unit 202 transmits an imaging instruction message to capture images to the remote camera 100 through the wireless communication unit 203. Then, the process proceeds to Step S105. When receiving the imaging instruction message transmitted from the imaging instruction unit 202 through the wireless communication unit 102, the imaging unit 101 of the remote camera 100 captures an image and generates a RAW image signal. Then, the imaging unit 101 transmits the generated RAW image signal to the imaging operation terminal 200 through the wireless communication unit 102.

(Step S105) The wireless communication unit 203 receives the RAW image signal transmitted from the imaging unit 101 of the remote camera 100 on the basis of the imaging instruction message transmitted in Step S104. Then, the process proceeds to Step S106.

(Step S106) The image processing unit 204 performs image processing for converting the RAW image signal received by the wireless communication unit 203 in Step S105 into a format which can be displayed on the display unit 206 and generates display image data. Then, the process proceeds to Step S107.

(Step S107) The display control unit 205 displays the display image data generated by the image processing unit 204 in Step S106 on the display unit 206. That is, the display control unit 205 displays the image based on the RAW image signal generated by the imaging operation of the imaging unit 101 of the remote camera 100 on the display unit 206. Then, the process ends. After Step S107, the process may return to Step S101 such that images can be continuously captured.

As described above, according to this embodiment, the imaging operation terminal 200 includes the imaging unit 201. Until the shutter is pressed, the imaging operation terminal 200 displays the image based on the image signal which is generated by the imaging operation of the imaging unit 201 as a live-view image on the display unit 206. Therefore, the imaging operation terminal 200 can display the live-view image, without receiving the RAW image signal transmitted from the imaging unit 101 of the remote camera 100. As a result, the imaging operation terminal 200 can display the live-view image with little delay, while ensuring sufficient resolution.

When the imaging unit 101 of the remote camera 100 has, for example, the LF structure or the MS structure and image processing for converting the RAW image signal generated by the imaging unit 101 into a format which can be displayed on the display unit 206 is performed by hardware, costs increase. However, in this embodiment, the image processing used to convert the RAW image signal generated by the imaging unit 101 into the format which can be displayed on the display unit 206 is performed by software of the imaging operation terminal 200. Therefore, it is possible to reduce costs.

Since the image processing for converting the RAW image signal generated by the imaging unit 101 into the format which can be displayed on the display unit 206 is performed by software of the imaging operation terminal 200, it is possible to rapidly implement image processing even when the structure of the imaging unit 101 of the remote camera 100 is not conventional structure, like an RGB sensor with a Bayer pattern.

Figure 9:
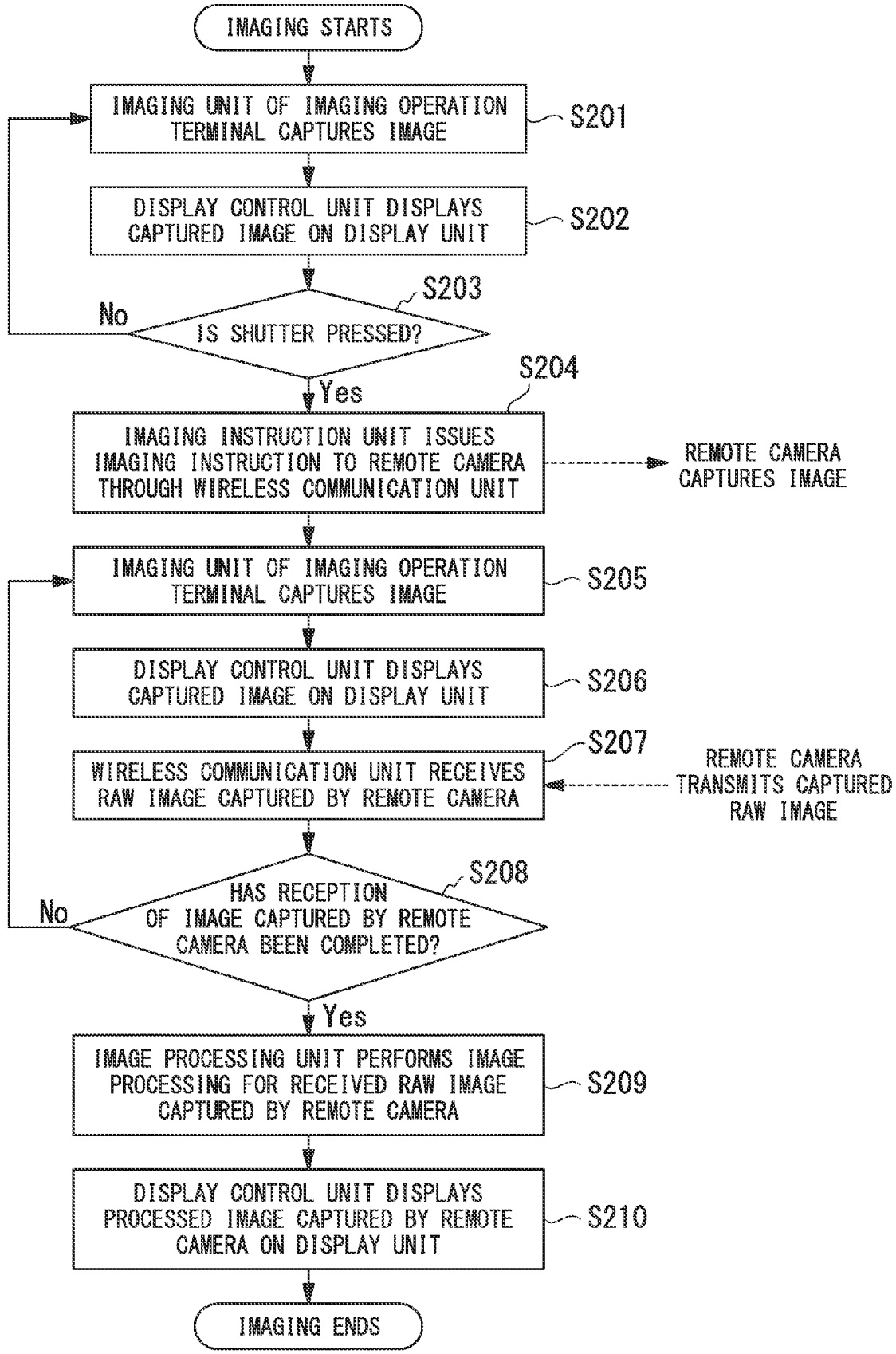
FIG. 9 is a flowchart illustrating an operation procedure of the imaging operation terminal according to the first embodiment of the present invention during imaging.

Next, an operation procedure different from the operation procedure of the imaging operation terminal 200 during imaging shown in FIG. 8 will be described. FIG. 9 is a flowchart illustrating the operation procedure of the imaging operation terminal 200 according to this embodiment during imaging. The process in Steps S201 to S204 is the same as that in Steps S101 to S104 shown in FIG. 8.

(Step S205) The imaging unit 201 of the imaging operation terminal 200 captures an image and generates an image signal. Then, the process proceeds to Step S206.

(Step S206) The image processing unit 204 performs image processing for the image signal generated by the imaging unit 201 in Step S205 to generate display image data. Then, the display control unit 205 displays the display image data generated by the image processing unit 204 as a live-view image on the display unit 206. Then, the process proceeds to Step S207.

(Step S207) The wireless communication unit 203 receives the RAW image signal transmitted from the imaging unit 101 of the remote camera 100 on the basis of the imaging instruction message transmitted in Step S204. Then, the process proceeds to Step S208.

(Step S208) The wireless communication unit 203 determines whether the reception of the RAW image signal transmitted from the imaging unit 101 of the remote camera 100 has been completed. When the wireless communication unit 203 determines that the reception of the RAW image signal has been completed, the process proceeds to Step S209. In the other cases, the process returns to Step S205.

The process in Steps S209 and S210 is the same as that in Steps S106 to S107 shown in FIG. 8. After Step S210, the process may return to Step S201 such that images can be continuously captured.

As described above, according to the example of the operation shown in FIG. 9, the imaging operation terminal 200 displays the image based on the image signal, which is generated by the imaging operation of the imaging unit 201, as a live-view image on the display unit 206 until the RAW image signal generated by the imaging operation of the imaging unit 101 of the remote camera 100 is prepared to display on the display unit 206. Therefore, even after the imaging instruction is issued (even after the shutter is pressed), it is possible to display a live-view image with little delay in order for the next imaging instruction, while ensuring sufficient resolution.

Figure 10:
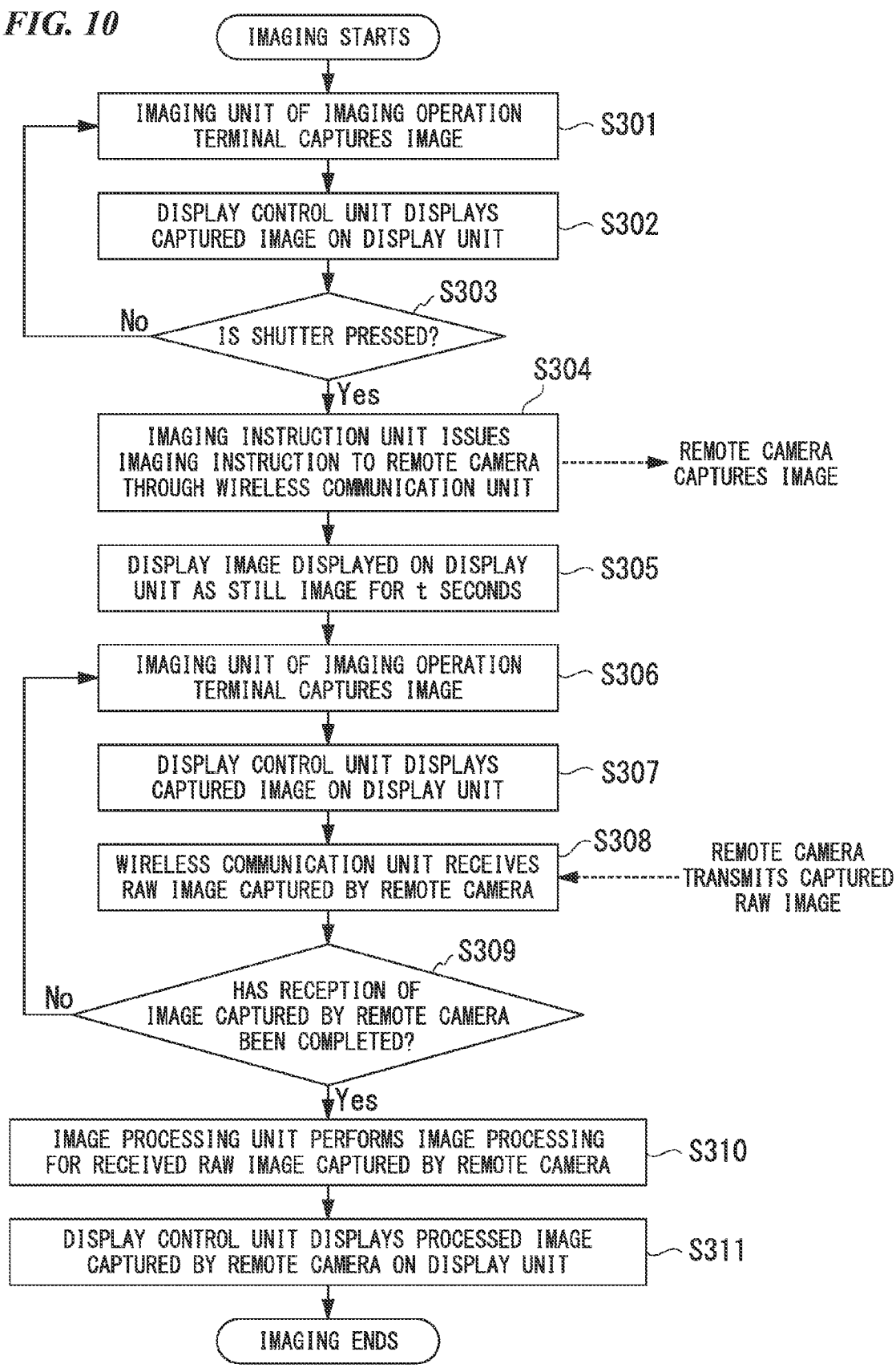
FIG. 10 is a flowchart illustrating an operation procedure of the imaging operation terminal according to the first embodiment of the present invention during imaging.

Next, an operation procedure different from the operation procedure of the imaging operation terminal 200 during imaging shown in FIGS. 8 and 9 will be described. FIG. 10 is a flowchart illustrating the operation procedure of the imaging operation terminal 200 according to this embodiment during imaging. The process in Steps S301 to S304 is the same as that in Steps S201 to S204 shown in FIG. 9.

(Step S305) The display control unit 205 displays the image which is displayed on the display unit 206 in Step S302 as a still image for t seconds (a predetermined period of time). Then, the process proceeds to Step S306. The t seconds may be predetermined or arbitrarily set.

The process in Steps S306 to S311 is the same as that in Steps S205 to S210 shown in FIG. 9. After Step S311, the process may return to Step S301 such that images can be continuously captured.

As described above, according to the example of the operation shown in FIG. 10, after the shutter is pressed, the imaging operation terminal 200 displays the image based on the image signal which has been generated by the imaging operation of the imaging unit 201 immediately before the shutter is pressed as a still image for a predetermined period of time. Therefore, the photographer can recognize the captured object.

(Second Embodiment)

Next, a second embodiment of the present invention will be described. This embodiment differs from the first embodiment in that a remote camera includes an image processing unit and the image processing unit of the remote camera performs image processing for a RAW image signal generated by an imaging unit of the remote camera. The other structures and operations are the same as those in the first embodiment.

Figure 11:
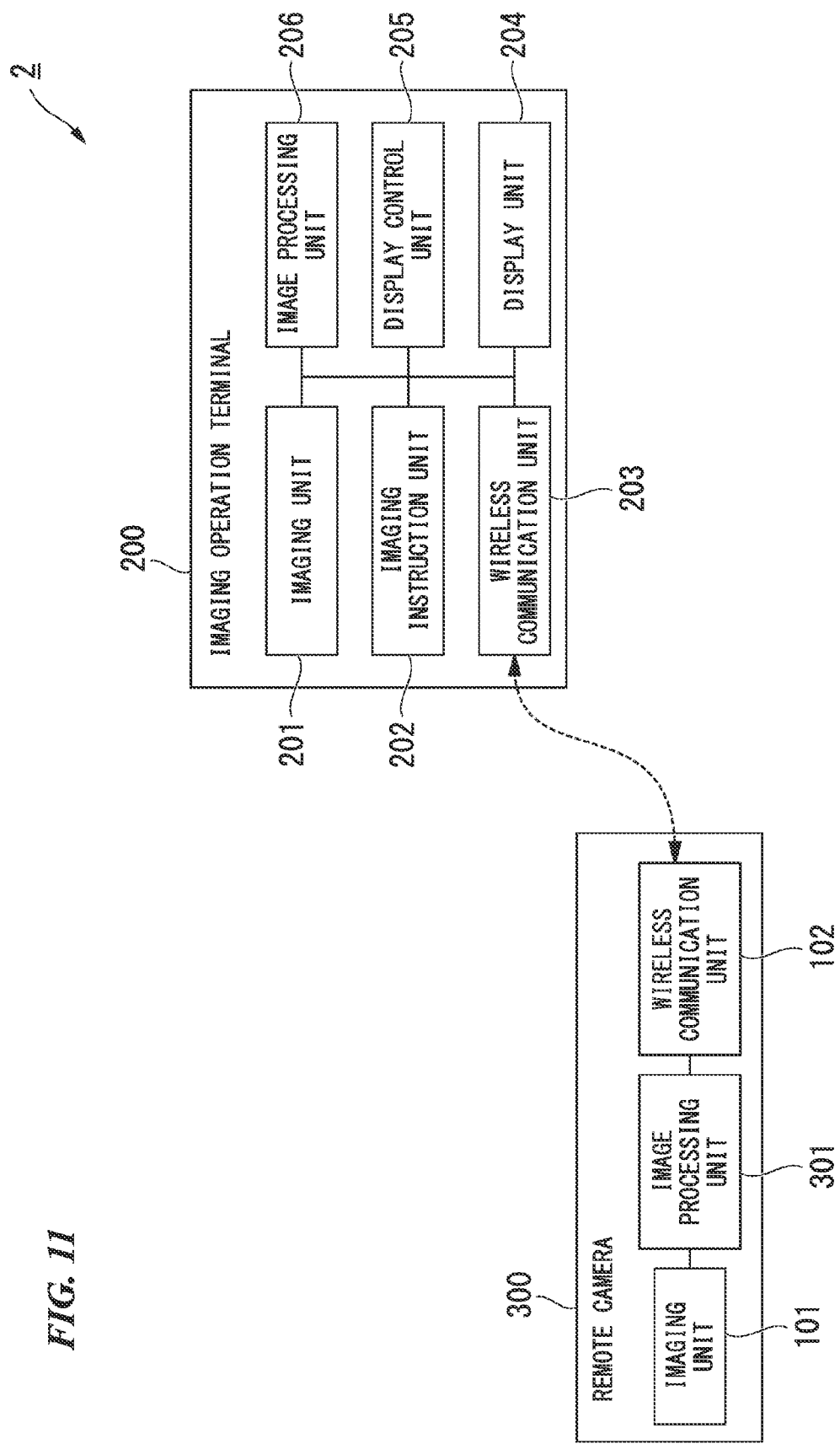
FIG. 11 is a block diagram illustrating the structure of an imaging system according to a second embodiment of the present invention.

FIG. 11 is a block diagram illustrating the structure of an imaging system 2 according to this embodiment. In the example shown in FIG. 11, the imaging system 2 includes a remote camera 300 and an imaging operation terminal 200 (captured image display device). The structure of the imaging operation terminal 200 is the same as that of the imaging operation terminal 200 according to the first embodiment.

The remote camera 300 includes an imaging unit 101, a wireless communication unit 102, and an image processing unit 301. The imaging unit 101 and the wireless communication unit 102 have the same structure as those in the first embodiment. The image processing unit 301 performs image processing for converting a RAW image signal generated by the imaging unit 101 into a format which can be displayed on a display unit 206 to generate display image data. In this embodiment, the image processing function of the image processing unit 301 is implemented by hardware.

Figure 12:
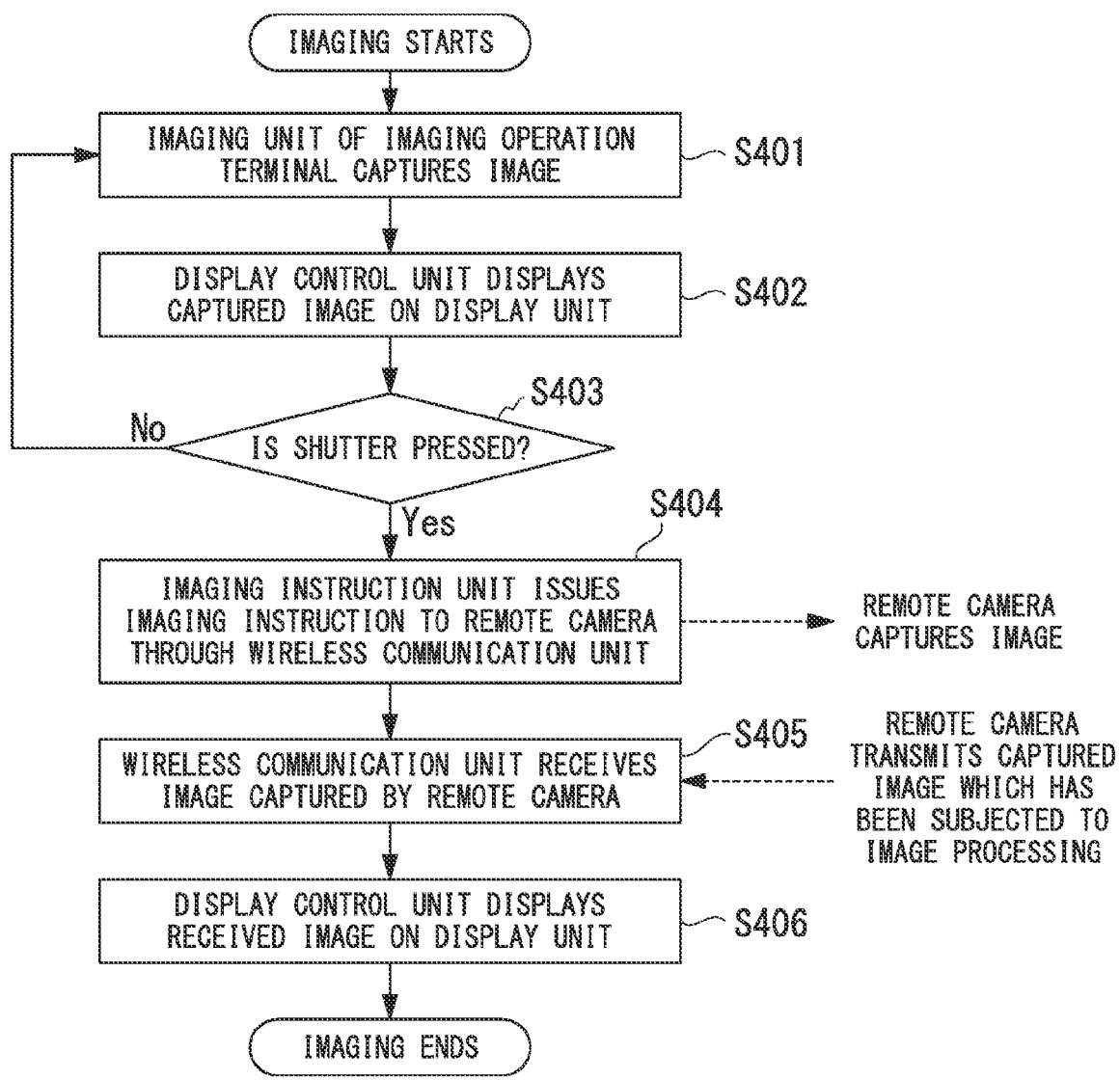
FIG. 12 is a flowchart illustrating an operation procedure of an imaging operation terminal according to the second embodiment of the present invention during imaging.

Next, an operation of the imaging operation terminal 200 during imaging will be described. FIG. 12 is a flowchart illustrating the operation procedure of the imaging operation terminal 200 according to this embodiment during imaging. The process in Steps S401 to S403 is the same as that in Steps S101 to S103 shown in FIG. 8.

(Step S404) An imaging instruction unit 202 transmits an imaging instruction message to capture images to the remote camera 300 through a wireless communication unit 203. Then, the process proceeds to Step S405. When receiving the imaging instruction message transmitted from the imaging instruction unit 202 through the wireless communication unit 102, the imaging unit 101 of the remote camera 300 captures an image and generates a RAW image signal. Then, the image processing unit 301 of the remote camera 300 performs image processing for converting the RAW image signal generated by the imaging unit 101 into the format which can be displayed on the display unit 206 to generate display image data. Then, the wireless communication unit 102 transmits the display image data generated by the image processing unit 301 to the imaging operation terminal 200.

(Step S405) The wireless communication unit 203 receives the display image data transmitted from the imaging unit 101 of the remote camera 300 on the basis of the imaging instruction message transmitted in Step S104. Then, the process proceeds to Step S406.

(Step S406) A display control unit 205 displays the display image data received by the wireless communication unit 203 in Step S106 on the display unit 206. That is, the display control unit 205 displays the image based on the RAW image signal generated by the imaging operation of the imaging unit 101 of the remote camera 300 on the display unit 206. Then, the process ends. After Step S406, the process may return to Step 401 such that images can be continuously captured.

As described above, according to this embodiment, the imaging operation terminal 200 includes the imaging unit 201. The remote camera 300 includes the image processing unit 301. The image processing unit 301 performs image processing for converting the RAW image signal generated by the imaging operation of the imaging unit 101 of the remote camera 300 into the format which can be displayed on the display unit 206 and generates display image data. Then, the imaging operation terminal 200 displays the image based on the image signal which is generated by the imaging operation of the imaging unit 201 as a live-view image on the display unit 206 until the shutter is pressed. Therefore, the imaging operation terminal 200 can display the live-view image, without receiving the display image data based on the RAW image signal which is generated by the imaging unit 101 of the remote camera 300. Therefore, the imaging operation terminal 200 can display a live-view image with little delay, while ensuring sufficient resolution.

The image processing unit 301 of the remote camera 300 performs image processing for converting the RAW image signal generated by the imaging operation of the imaging unit 101 of the remote camera 300 into a format which can be displayed on the display unit 206. Therefore, it is possible to reduce the amount of data transmitted from the remote camera 300 to the imaging operation terminal 200. As a result, it is possible to display the image based on the RAW image signal which is generated by the imaging unit 101 of the remote camera 300 on the display unit 206 in a short time after the imaging instruction unit 202 receives the input imaging instruction.

The first and second embodiments of the present invention have been described in detail above with reference to the drawings. However, the detailed structures are not limited to the embodiments, but the present invention also includes the design without departing from the scope and spirit of the present invention. For example, in the above-described embodiments, the RAW image signal generated by the imaging operation of the imaging unit 101 or the display image data generated by the image processing of the image processing unit 204 is not stored. However, the imaging operation terminal 200 may include a storage unit. In the above-described embodiments, the image processing unit 301, which is hardware, converts the RAW image signal into the format which can be displayed on the display unit 206. However, the image processing unit 301 may perform some of the image processing functions and wirelessly transmit the image data to the imaging operation terminal 200 and the image processing unit 204 of the imaging operation terminal 200 may perform the remaining image processing functions.

All or some of the functions of each unit provided in the remote cameras 100 and 300 and the imaging operation terminal 200 according to the above-described embodiments may be implemented by recording a program for implementing the functions on a computer-readable recording medium, allowing a computer system to read the program recorded on the recording medium and to execute the program. The "computer system" may include an OS and hardware, such as peripheral devices.

The "computer-readable recording medium" is a portable medium, such as a flexible disk, a magneto-optical disk, a ROM, or a CD-ROM, or a storage unit, such as a hard disk provided in the computer system. The "computer-readable recording medium" may include a recording medium that dynamically stores a program for a short period of time, such as a communication line used when a program is transmitted through a network such as the Internet or a communication line such as a telephone line, or a recording medium that stores a program for a predetermined period of time, such as a volatile memory provided in a computer system serving as a server or a client. Furthermore, the program may be executed to implement some of the above-mentioned functions. Further, the above-mentioned functions may be implemented by combinations of all programs recorded on the computer system.

While preferred embodiments of the present invention have been described, the present invention is not limited to the embodiments. Additions, omissions, substitutions, and other variations may be made to the present invention without departing from the spirit and scope of the present invention. The present invention is not limited by the above description, and is only limited by the appended claims.

What is claimed is:

1. A captured image display device comprising:
a wireless communication unit;
a first imaging unit;
a display unit;
an imaging instruction unit which issues an imaging instruction to a remote camera that wirelessly communicates with the wireless communication unit and that includes a second imaging unit;
an image processing unit which performs image processing to convert a first image data captured by the first imaging unit into an image displayed on the display unit, and when the wireless communication unit wirelessly receives a second image data corresponding to an image which is captured by the second imaging unit of the remote camera responsive to the imaging instruction, performs image processing to convert the second image data into the image displayed on the display unit; and a display control unit which causes an image corresponding to the first image data from the first imaging unit to be displayed on the display unit until the image processing unit completes the image processing for the second image data from the second imaging unit of the remote camera after the imaging instruction is issued.

2. The captured image display device according to claim 1, wherein the display control unit causes the image corresponding to the first image data from the first imaging unit to be displayed on the display unit for a predetermined period of time when the imaging instruction is issued.

3. The captured image display device according to claim 1, wherein the imaging instruction unit issues the imaging instruction to the remote camera which includes a multi-spectral imaging element having color filters of four or more colors.

4. The captured image display device according to claim 1, wherein the imaging instruction unit issues the imaging instruction to the remote camera which includes a light field imaging element having a micro lens array.

5. An imaging system comprising:
a remote camera including
  a first wireless communication unit,
  a first imaging unit; and
a captured image display device including
  a second wireless communication unit wirelessly communicating with the first wireless communication unit,
  a second imaging unit,
  a display unit,
  an imaging instruction unit which issues an imaging instruction to the remote camera via the second wireless communication unit,
  an image processing unit which performs image processing to convert a first image data captured by the second imaging unit of the captured image display device into an image displayed on the display unit, and when the second wireless communication unit wirelessly receives a second image data corresponding to an image which is captured by the first imaging unit of the remote camera responsive to the imaging instruction, performs image processing to convert the second image data into the image displayed on the display unit, and
  a display control unit which causes an image corresponding to the first image data to be displayed on the display unit until the image processing unit completes the image processing for the second image data after the imaging instruction is issued.

6. A captured image display method comprising:
performing image processing to convert a first image data captured by a first imaging unit into an image displayed on a display unit;
issuing an imaging instruction to a remote camera which wirelessly communicates with a wireless communication unit;
responsive to receipt of a second image data corresponding to an image which is captured by a second imaging unit of the remote camera responsive to the imaging instruction, performing image processing to convert the second image data into the image displayed on the display unit; and
displaying an image corresponding to the first image data on the display unit until the image processing for the second image data is completed in the performing of the imaging processing after the imaging instruction is issued.

7. A non-transitory computer-readable device storing a program that causes a computer to perform:
performing image processing to convert first image data captured by a first imaging unit into an image displayed on a display unit;
issuing an imaging instruction to a remote camera which wirelessly communicates with a wireless communication unit;
responsive to receipt of a second image data corresponding to an image which is captured by a second imaging unit of the remote camera responsive to the imaging instruction, performing image processing to convert the second image data into the image displayed on the display unit; and
displaying an image corresponding to the first image data on the display unit until the image processing for the second image data is completed in the performance of the imaging processing after the imaging instruction is issued.

* * * * *